2,728,744

COMPOSITIONS CONTAINING A POLYHYDRIC ALCOHOL AND GLYCIDYL ETHERS

Clayton A. May, Oakland, and Edward C. Shokal, Walnut Creek, Calif., assignors to Shell Development Company, Emeryville, Calif., a corporation of Delaware No Drawing. Application March 29, 1952,
Serial No. 279,463

9 Claims. (Cl. 260—47)

This invention relates to compositions containing glycidyl ethers which are substantially free of alcoholic hydroxyl groups in admixture with a small proportion of an aliphatic polyhydric alcohol.

Glycidyl ethers having a 1,2-epoxy equivalency greater than 1.0 can be cured to resinous materials by adding an amine curing agent and heating the mixture. If the glycidyl ether is substantially free of alcoholic hydroxyl groups, the rate of resinification is unduly long. We have now discovered a composition which, although it contains a glycidyl ether which is substantially free of alcoholic hydroxyl groups as predominant component, is adapted to cure relatively rapidly upon addition thereto of an amine curing agent and heating the mixture.

The composition of our invention comprises a glycidyl ether having a 1,2-epoxy equivalency greater than 1.0 which is substantially free of alcoholic hydroxyl groups in admixture with an added neutral aliphatic polyhydric alcohol in amount of about 0.07 to 0.25 hydroxyl equivalents of the alcohol per 100 grams of the ether. The glycidyl ether is free of elements other than carbon, hydrogen, oxygen and chlorine. The composition is very useful in a variety of applications such as adhesive formulations for bonding metal to metal, potting uses where electrical components and circuits are embedded in the cured resin, and casting compositions employed to produce various articles of manufacture.

The glycidyl ethers with which the invention is concerned include a variety of substances. The ethers are free or substantially free of alcoholic hydroxyl groups since no advantage in rate of cure is achieved by adding the polyhydric alcohol to glycidyl ethers which have a substantial content of alcoholic hydroxyl groups. The effect is marked, however, with glycidyl ethers having a hydroxyl value less than 0.12 equivalents of alcoholic hydroxyl groups per 100 grams and it is such ethers that are contained as predominant component in the composition of the invention.

The glycidyl ethers employed in the invention can be essentially pure simple compounds as is the case, for example, with diglycidyl monoether; the diglycidyl diethers of a dihydric alcohol or phenol such as ethylene glycol, propylene glycol, diethylene glycol, triethylene glycol, styrene glycol, resorcinol, catechol, 2,2-bis(4-hydroxyphenyl)propane, 4,4'-dihydroxybenzophenone, 4,4'-dihydroxydiphenyl, bis(4-hydroxyphenyl)methane, 1,1-bis(4-hydroxyphenyl)ethane, 1,5-dihydroxynaphthalene, etc., and glycidyl polyether of a polyhydric alcohol or phenol having a greater plurality of hydroxyl groups (each of which is replaced with a glycidyloxy group in the glycidyl polyether) such as glycerol, erythritol, pentaerythritol, diglycerol, sorbitol, pyrogallol, phloroglucinol, phenolformaldehyde novolac resin, etc. The foregoing simple compounds are devoid or free of alcoholic hydroxyl groups and have a 1,2-epoxy equivalency (the number of 1,2-epoxy groups per molecule) greater than 1.0, the 1,2-epoxy equivalency being two for diglycidyl ethers, three for triglycidyl triethers, etc.

More usually the composition contains a glycidyl ether which is not a simple compound owing to the difficulty in preparing the compounds in pure state. This is particularly true of glycidyl polyethers of polyhydric phenols prepared by reacting the polyhydric phenol in known fashion with epichlorhydrin while having present a considerable stoichiometric excess of epichlorhydrin and sufficient sodium hydroxide or other base to combine with the hydrogen chloride formed in the reaction. The product is a complex material rather than a simple compound. Thus by reacting a dihydric phenol with epichlorhydrin and using at least 4 mols of epichlorhydrin per mol of dihydric phenol with addition of sodium hydroxide to the reaction mixture at such rate that it is kept substantially neutral while at a reaction temperature of about 50° C. to 150° C., there is obtained a mixture of polyethers of the formula

R'(O—R—CH$_2$—CHOH—CH$_2$)$_n$O—R—O—R'' wherein $n$ is a value of about 0 to 0.1, R is the hydrocarbon radical of the dihydric phenol, and R' and R'' are predominantly glycidyl radicals with a small proportion of 2,3-dihydroxypropyl and 3-chloro-2-hydroxypropyl radicals. This complex material also has a 1,2-epoxy equivalency greater than 1.0 and has a hydroxyl value of less than 0.12 hydroxyl equivalents per 100 grams. The hydrocarbon radical R is that of the dihydric phenol utilized in preparing the polyether, typical examples of the dihydric phenol having been enumerated above.

Another glycidyl ether employed in the composition that is of still more complex character is an epoxy ester of a mixture of polyethers of the formula

R'(O—R—O—CH$_2$—CHOH—CH$_2$)$_n$O—R—O—R'' wherein $n$ is a value of 0 to 15, R is the hydrocarbon radical of a dihydric phenol, and R' and R'' are members of the class consisting of glycidyl, 2,3-dihydroxypropyl, and 3-chloro-2-hydroxypropyl radicals with glycidyl radicals constituting at least 60% of the R' and R'' groups, said ester having at least 90% of the glycidyl radicals of the above-described polyethers intact as glycidyl radicals and having such an extent of the alcoholic hydroxyl groups replaced with acyloxy groups of a saturated fatty acid of 2 to 4 carbon atoms that the epoxy ester has a hydroxyl value of less than 0.12 equivalents of alcoholic hydroxyl groups per 100 grams. While R can be the hydrocarbon radical of any dihydric phenol as described before, it is preferred that R be the 2,2-bis(4-phenylene) propane radical of 2,2-bis(4-hydroxyphenyl)propane which is termed bis-phenol hereinafter for convenience. The mixture of polyethers from which the epoxy ester is derived is obtainable by reacting the dihydric phenol in known manner with more than one mol of epichlorhydrin per mol of the phenol while having present about 2% to 35% stoichiometric excess of base such as sodium hydroxide. The epoxy ester is prepared by reacting the glycidyl polyether of the dihydric phenol with the anhydride of the saturated fatty acid while distilling the liberated fatty acid from the reaction mixture substantially as fast as formed. In order to insure that substantially all of the hydroxyl groups of the polyether are converted to acyloxy groups, a stoichiometric excess of two to ten fold of the anhydride is employed. The preparation of the epoxy esters is described fully in our companion application, Serial No. 279,462, filed simultaneously herewith. The epoxy esters of acetic and propionic acids are particularly desirable for use in the composition.

The composition of the invention is prepared by adding the aliphatic polyhydric alcohol to the glycidyl ether and uniformly distributing the alcohol in the ether by mixing. The amount of polyhydric alcohol added to the glycidyl ether is critical. In order that a substantial increase in rate of cure will be obtained, at least about 0.07 hydroxyl equivalents of the polyhydric alcohol is added per 100 grams of the ether. The most that is added is about 0.25 hydroxyl equivalents per 100 grams of the ether because larger proportions do not greatly increase the rate of cure, but they do make the cured composition soft and rubbery which is most undesirable. By employing about an added 0.07 to 0.25 hydroxyl equivalents of the polyhydric alcohol per 100 grams of the glycidyl ether, cure of the composition is obtained rapidly and the resulting resinous product has substantially the same tough hardness as is obtained on curing the glycidyl ether alone.

Various neutral aliphatic polyhydric alcohols are employed as curing rate promoters in the composition, but it has been discovered that by far the best results are obtained with a saturated polyhydric alcohol of 2 to 6 carbon atoms having a single hydroxyl group linked directly to each carbon atom thereof as typified by ethylene glycol, glycerol, erythritol, mannitol, and sorbitol. Other polyhydric alcohols which may be used include propylene glycol, diethylene glycol, dipropylene glycol, 1,2-dihydroxybutene-2, glycerol monoacetate, glycerol monooleate, trimethylene glycol, and the like, but it is most desirable that the compound have each of the hydroxyl group linked to carbon atoms which are linked to each other in a chain and it is preferable that the compound contain at least one primary alcoholic hydroxyl group. All of the hydroxyl groups in the polyhydric alcohols are linked singly to saturated aliphatic carbon atoms.

It is essential that the added polyhydric alcohol be a neutral compound, i. e., be neither acidic nor basic. The neutral polyhydric alcohol, as is usual with such compounds, contains only the elements carbon, hydrogen and oxygen and is free of other elements. If the polyhydric alcohol were non-neutral as with triethanolamine of tartaric acid, the glycidyl ether would start to resinify upon mere addition of the polyhydric compound thereto. In contrast to such an undesirable result, our composition can be prepared and stored for any length of time before desired use. The composition does not undergo cure until a hardening agent is added.

In applying the composition to its sundry uses, the hardening agent is mixed with the composition and the mixture is normally heated to effect cure to the hard resinous product. For this purpose, temperatures of about 50° C. to 200° C. are employed, although if desired cure can be accomplished as low as about 20° C. or room temperature if desired. Various amine curing agents are used in amounts of about an added 3% to 15% by weight, representative amines being piperidine, diethylene triamine, dimethylbenzylamine, triethylamine, diethylamine, ethylene diamine, and the like.

The invention will be better understood upon considering some examples of the composition and their performance on curing. Preparation of certain components will be described first. The parts are by weight.

POLYETHER A

Bis-phenol is dissolved in epichlorhydrin in the proportion of 5,130 parts (22.5 mols) of bis-phenol in 20,812 parts (225 mols) of epichlorhydrin and 104 parts of water. The solution is prepared in a kettle provided with heating and cooling equipment, agitator, distillation condenser and receiver. A total of 1,880 parts of solid 97.5% sodium hydroxide, corresponding to 2.04 mols of sodium hydroxide per mol of bis-phenol (2% excess) is added in installments. The first installment of 300 parts of sodium hydroxide is added and the mixture heated with efficient agitation. The heating is discontinued as the temperature reaches 80° C. and cooling is started in order to cool the exothermic heat of reaction. The control is such that the temperature rises only to about 100° C. When the exothermic reaction has ceased and the temperature has fallen to 97° C., a further addition of 316 parts of sodium hydroxide is made and similar further additions are effected at successive intervals. An exothermic reaction takes place after each addition. Sufficient cooling is applied so there is gentle distillation of epichlorhydrin and water, but the temperature is not allowed to go below about 95° C. No cooling is necessary after the final addition of sodium hydroxide. After the last addition of sodium hydroxide with completion of the reaction, the excess epichlorhydrin is removed by vacuum distillation with use of a kettle temperature up to 150° C. and a pressure of 50 mm. Hg. After completion of the distillation, the residue is cooled to about 90° C. and about 360 parts of benzene added. Cooling drops the temperature of the mixture to about 40° C. with precipitation of salt from the solution. The salt is removed by filtration and the removed salt carefully washed with about an additional 360 parts of benzene to remove polyether therefrom. The two benzene solutions are combined and distilled to separate the benzene. When the kettle temperature reaches 125° C., vacuum is applied and distillation continued to a kettle temperature of 170° C. at 25 mm. pressure. The resulting glycidyl polyether is a viscous liquid at room temperature which has a Durrans' Mercury Method softening point of 9° C. and the following analysis:

Hydroxyl value, gram equiv./100 grams _____ 0.100
Epoxy value, gram equiv./100 grams _____ 0.501
Chlorine, per cent _____ 0.98
Molecular weight _____ 357

The analysis indicates that the polyether has a value of $n=0.072$ in the previously described structural formula with about 90.3% of the terminal glyceryl radicals existing as glycidyl groups, 4.7% as 2,3-dihydroxypropyl groups and 5.0% as 3-chloro-2-hydroxypropyl groups. The 1,2-epoxy equivalency is 1.8.

POLYETHER B

A solution consisting of 117 parts of water, 12.2 parts of sodium hydroxide and 133.8 parts of bis-phenol is prepared by heating the mixture of ingredients to 170° C. in a closed reactor fitted with a stirrer, and then cooling to about 46° C., at which temperature 140.6 parts of epichlorhydrin are added while agitating the mixture. After 25 minutes have elapsed, there is added during an additional 15 minutes' time a solution consisting of 56.2 parts of sodium hydroxide in 117 parts of water. This causes the temperature to rise to 63° C. and stirring is continued at about 70° C. for 30 minutes. The stirred reaction mixture is washed with water for about 4.5 hours. The product is dried by heating to a final temperature of 140° C. in 80 minutes, and cooled rapidly. The resulting glycidyl polyether is a very viscous liquid at room temperature which has a Durrans' Mercury Method softening point of 27° C. and the following analysis:

Hydroxyl value, gram equiv./100 grams _____ 0.142
Epoxide value, gram equiv./100 grams _____ 0.405
Chlorine, per cent _____ 0.61
Water, per cent _____ 0.34
Molecular weight _____ 460

The foregoing analysis indicates that the polyether has a value of $n=0.41$ in the previously described structural formula with about 92% of the terminal glyceryl radicals existing as glycidyl groups, 4.1% as 2,3-dihydroxypropyl groups and 3.9% as 3-chloro-2-hydroxypropyl groups.

EPOXY ESTER A

A solution of 1000 parts of Polyether B in 200 parts of toluene was dehydrated by azeotropic distillation. A solution of 1500 parts of acetic anhydride in 1000 parts of toluene was placed in a vessel equipped with a distillation column and a dropping funnel, and subjected to distillation with removal of about 160 parts of distillate whereupon the dehydrated solution of Polyether B was added during the course of about an hour with removal of about 410 parts of distillate containing liberated acetic acid in admixture with toluene. Boiling and distillation were continued for about 2.25 hours more with recovery of about 600 parts of distillate. The reaction mixture was then subjected to stripping under a Claisen head with nitrogen sparge to a final temperature of 157° C. and pressure of 0.4 mm. Hg. The viscous product in amount of 1055 parts of an expected 1059 parts analyzed as follows:

|  | Found | Theory |
|---|---|---|
| Ester value, eq./100 g | 0.145 | 0.134 |
| Hydroxyl value, eq./100 g | 0.003 | 0.000 |
| Epoxy value, eq./100 g | 0.377 | 0.383 |

The analysis indicates that esterification of alcoholic hydroxyl groups was about 98% complete and that about 98.5% of the epoxy groups survived the esterification without reacting.

EPOXY ESTER B

The epoxy propionate of Polyether B was prepared. A solution of 300 parts of Polyether B in 150 parts of monochlorobenzene was subjected to dehydration by azeotropic distillation. A mixture of 500 parts of monochlorobenzene and 570 parts of propionic anhydride in an apparatus as described in Epoxy Ester A was subjected to distillation with recovery of about 20 parts of distillate whereupon the solution of dehydrated Polyether B was added to the boiling mixture in about 30 minutes' time, some 120 parts of distillate being recovered during this period. The boiling of the reaction mixture was continued for about an additional 2 hours' time while recovering about 280 parts of distillate after which the reaction mixture was subjected to stripping under a Claisen head while sparging with nitrogen to a temperature of 154° C. at a pressure of less than 0.1 mm. Hg. The resulting viscous product was obtained in theoretical yield and analyzed as follows:

|  | Found | Theory |
|---|---|---|
| Ester value, eq./100 g | 0.165 | 0.131 |
| Hydroxyl value, eq./100 g | <0.001 | 0.000 |
| Epoxy value, eq./100 g | 0.358 | 0.375 |

The foregoing analysis shows that the desired esterification was complete and that about 96% of the epoxy groups survived unchanged.

Example 1

Compositions were prepared by adding and mixing ethylene glycol or glycerol with Polyether A in amount of 0.15 hydroxyl equivalents of the polyhydric alcohol per 100 grams of the polyether. To the compositions were added 5 parts of piperidine per 100 parts of polyether as curing agent. A blank for comparison containing no added polyhydric alcohol was also prepared. The mixtures were heated in an oven at 65° C. and the time for gelation was observed. Although the compositions are not fully cured when gelation occurs, the gel time is indicative of the rate of cure. The material no longer flows when gelled and the time to reach this point can be determined quite precisely. The mixtures were allowed to continue to cure after gelation and the time for them to become hard was also observed. The cured compositions were hard and clear. The Barcol hardness at room temperature was measured after curing 24 hours. The results are tabulated below.

| Polyhydric Alcohol per 100 Parts Polyether A | Time in Minutes to — | | Barcol Hardness |
|---|---|---|---|
|  | Gel | Become Hard |  |
| None | 200 | 380 | 28 |
| 4.65 parts ethylene glycol | 107 | 137 | 22 |
| 4.6 parts glycerol | 125 | 145 | 25 |

For purpose of comparison, compositions containing 0.15 hydroxyl equivalents of n-butanol or water per 100 grams of Polyether A were prepared. After adding 5 parts of piperidine as curing agent and subjecting the two mixtures to curing in the 65° C. oven, it was found that the composition containing butanol gelled in 147 minutes, did not become hard until 302 minutes and was relatively soft with a Barcol hardness of only 15 after 24 hours. The composition containing water gelled in 95 minutes and became hard in 135 minutes, but the casting was filled with innumerable bubbles so as to be useless.

Example 2

Compositions were prepared containing 0.075 and 0.15 hydroxyl equivalents of glycerol and 0.15 hydroxyl equivalents of ethylene glycol per 100 grams of Epoxy Ester A, and then 5 parts of piperidine per 100 parts of the glycidyl polyether were added to each of the three. The compositions were heated in an air oven at 65° C. along with a blank and the gel time was observed. It required 24 hours for the mixture containing no polyhydric alcohol to gel. The mixture containing the lesser proportion of glycerol gelled in 6 hours and the remaining two mixtures each gelled in 4½ hours.

Example 3

To 100 parts of Epoxy Ester B were added 4.6 parts of glycerol with mixing of the components, after which 5 parts of piperidine were added. Upon heating in an oven at 65° C., the mixture gelled in 5⅓ hours and became hard in 8 hours. Another mixture of 100 parts of Epoxy Ester B and 5 parts of piperidine similarly heated did not gel until 30 hours had elapsed, and 52 hours of heating at 65° C. were required for material to become hard.

Example 4

A composition containing 12.5 parts of triethylene glycol in 100 parts of Polyether A had 5 parts of piperidine mixed therewith and the mixture was heated in an oven at 65° C. The mixture gelled in 2 hours 40 minutes and became hard in 4 hours 10 minutes.

Example 5

To 100 parts of Polyether A were added about 10 parts of dipropylene glycol and 5 parts of piperidine. On heating in an oven at 65° C., the mixture gelled in 2 hours 25 minutes and became hard in 3 hours 55 minutes.

Example 6

About 100 parts of diglycidyl monoether mixed with 5 parts of piperidine were heated in an oven at 65° C. and found to gel in 370 minutes. Another composition containing 100 parts of diglycidyl monoether and 4.6 parts of glycerol had 5 parts of piperidine mixed therewith and was heated in the oven at 65° C. Gelation was found to occur in only 90 minutes.

The glycidyl polyethers of polyhydric phenols referred to herein are condensates of polyhydric phenols with epichlorhydrin. Particularly when derived from dihydric phenols, there are known as "ethoxyline" resins. See Chemical Week, vol 69, page 27, for September 8, 1951.

We claim as our invention:

1. A composition adapted to resinify rapidly upon addition thereto of an amine curing agent and heating of the mixture which comprises a glycidyl ether which is free of elements other than carbon, hydrogen, oxygen and chlorine, and has a 1,2-epoxy equivalency greater than 1.0, and a hydroxyl value of less than 0.12 equivalents of alcoholic hydroxyl groups per 100 grams in admixture with an added neutral aliphatic polyhydric alcohol in amount of about 0.07 to 0.25 hydroxyl equivalents of the alcohol per 100 grams of the ether, said alcohol being free from reactive groups other than alcoholic hydroxyl groups and also being free of elements other than carbon, hydrogen and oxygen.

2. A composition of matter which comprises glycidyl polyether of a dihydric phenol which is free of elements other than carbon, hydrogen, oxygen and chlorine, and has a 1,2-epoxy equivalency between 1.0 and 2.0, and a hydroxyl value of less than 0.12 equivalents of alcoholic hydroxyl groups per 100 grams which has admixed therewith about 0.07 to 0.25 hydroxyl equivalents of a neutral saturated aliphatic polyhydric alcohol per 100 grams of the polyether, said alcohol being free from reactive groups other than alcoholic hydroxyl groups and also being free of elements other than carbon, hydrogen and oxygen.

3. A composition of matter which comprises glycidyl polyether of a dihydric phenol which is free of elements other than carbon, hydrogen, oxygen and chlorine, and has a 1,2-epoxy equivalency between 1.0 and 2.0, and a hydroxyl value of less than 0.12 equivalents of alcoholic hydroxyl groups per 100 grams which has admixed therewith about 0.07 to 0.25 hydroxyl equivalents of a neutral saturated aliphatic polyhydric alcohol per 100 grams of the polyether, said polyhydric alcohol being free of elements other than carbon, hydrogen and oxygen, containing 2 to 6 carbon atoms and having a single hydroxyl group linked directly to each carbon atom thereof.

4. A composition of matter which comprises glycidyl polyether of 2,2-bis(4-hydroxyphenyl)propane which is free of elements other than carbon, hydrogen, oxygen and chlorine, and has a 1,2-epoxy equivalency between 1.0 and 2.0, and a hydroxyl value of less than 0.12 equivalents of alcoholic hydroxyl groups per 100 grams which has admixed therewith about 0.15 hydroxyl equivalents of glycerol per 100 grams of the polyether.

5. A composition of matter which comprises glycidyl polyether of 2,2-bis(4-hydroxyphenyl)propane which is free of elements other than carbon, hydrogen, oxygen and chlorine, and has a 1,2-epoxy equivalency between 1.0 and 2.0, and a hydroxyl value of less than 0.12 equivalents of alcoholic hydroxyl groups per 100 grams which has admixed therewith about 0.15 hydroxyl equivalents of ethylene glycol per 100 grams of the polyether.

6. A composition of matter which comprises glycidyl polyether of 2,2-bis(4-hydroxyphenyl)propane which is free of elements other than carbon, hydrogen, oxygen and chlorine, and has a 1,2-epoxy equivalency between 1.0 and 2.0, and a hydroxyl value of less than 0.12 equivalents of alcoholic hydroxyl groups per 100 grams which has admixed therewith about 0.15 hydroxyl equivalents of glycerol mono-oleate per 100 grams of the polyether.

7. A composition of matter which comprises an epoxy ester of a mixture of polyethers of the formula $$R'(O-R-O-CH_2-CHOH-CH_2)_nO-R-O-R''$$

wherein $n$ is a value of 0 to 15, R is the hydrocarbon radical of a dihydric phenol, and R' and R'' are members of the class consisting of glycidyl, 2,3-dihydroxypropyl, and 3-chloro-2-hydroxypropyl radicals with glycidyl radicals constituting at least 60% of the R' and R'' groups, said ester having at least 90% of the glycidyl radicals of the above-described polyethers intact as glycidyl radicals and having such an extent of the alcoholic hydroxyl groups replaced with acyloxy groups of a saturated fatty acid of 2 to 4 carbon atoms that the epoxy ester has a hydroxyl value of less than 0.12 equivalents of alcoholic hydroxyl groups per 100 grams, said composition having the epoxy ester mixed with about 0.07 to 0.25 hydroxyl equivalents of an added neutral saturated aliphatic polyhydric alcohol per 100 grams of the epoxy ester, said polyhydric alcohol being free of elements other than carbon, hydrogen and oxygen, containing 2 to 6 carbon atoms and having a single hydroxyl group linked directly to each carbon atom thereof.

8. A composition as defined in claim 7 wherein R is the 2,2-bis(4-phenylene)propane radical, the saturated fatty acid is acetic acid, and the added polyhydric alcohol is glycerol.

9. A composition as defined in claim 7 wherein R is the 2,2-bis(4-phenylene)propane radical, the saturated fatty acid is propionic acid, and the added polyhydric alcohol is glycerol.

References Cited in the file of this patent

UNITED STATES PATENTS

| 2,528,360 | Greenlee | Oct. 31, 1950 |
| 2,548,447 | Shokal | Apr. 10, 1951 |
| 2,615,007 | Greenlee | Oct. 21, 1952 |
| 2,627,483 | Dowd | Feb. 3, 1953 |

FOREIGN PATENTS

| 497,540 | Belgium | Feb. 12, 1951 |